United States Patent [19]

Begin

[11] Patent Number: 4,514,797
[45] Date of Patent: Apr. 30, 1985

[54] WORN TOOL DETECTOR UTILIZING NORMALIZED VIBRATION SIGNALS

[75] Inventor: John D. Begin, Warren, Mich.

[73] Assignee: GTE Valeron Corporation, Troy, Mich.

[21] Appl. No.: 414,735

[22] Filed: Sep. 3, 1982

[51] Int. Cl.³ .............................................. G06F 15/46
[52] U.S. Cl. .................................... 364/148; 364/157; 364/475; 364/507; 364/508; 364/551; 73/104; 73/660; 340/680; 340/683
[58] Field of Search ............... 364/475, 550, 508, 507, 364/551, 566, 148, 157; 73/104, 660; 408/8–13; 340/679, 680, 683

[56] References Cited

U.S. PATENT DOCUMENTS

| | | | |
|---|---|---|---|
| Re. 30,298 | 6/1980 | Keller | 364/475 X |
| 3,694,637 | 9/1972 | Edwin et al. | 364/508 |
| 4,023,044 | 5/1977 | Miller et al. | 307/116 |
| 4,207,567 | 6/1980 | Juengel et al. | 73/104 X |
| 4,228,514 | 10/1980 | Wiess | 364/475 X |
| 4,399,513 | 8/1983 | Sullivan et al. | 364/508 X |
| 4,471,444 | 9/1984 | Yee et al. | 364/475 |

OTHER PUBLICATIONS

Technical Paper entitled, "An On-Line Method of Determining Tool Wear by Time-Domain Analysis", Society of Manufacturing Engineers, MR82-901.

Primary Examiner—Jerry Smith
Assistant Examiner—Allen MacDonald
Attorney, Agent, or Firm—Harness, Dickey & Pierce

[57] ABSTRACT

A worn tool detector system for analyzing input signals from a sensor were the signal is in the form of an analog waveform exhibiting periodic impulses exceeding the average amplitude thereof as the tool wears. A microprocessor controlled variable gain amplification network is utilized to normalize the average waveform amplitude to a fixed level. During machine operation, impulses are detected by comparing the sensor waveform to a programmable selected ratio of the normalized level. When a given number of successive impulses are received the microprocessor generates a warning signal which may be used to retract the tool. An adaptive mode is disclosed wherein the sensor waveform throughout the course of the machining operation is repetitively normalized to adjust for different sensor waveform amplitudes.

17 Claims, 7 Drawing Figures

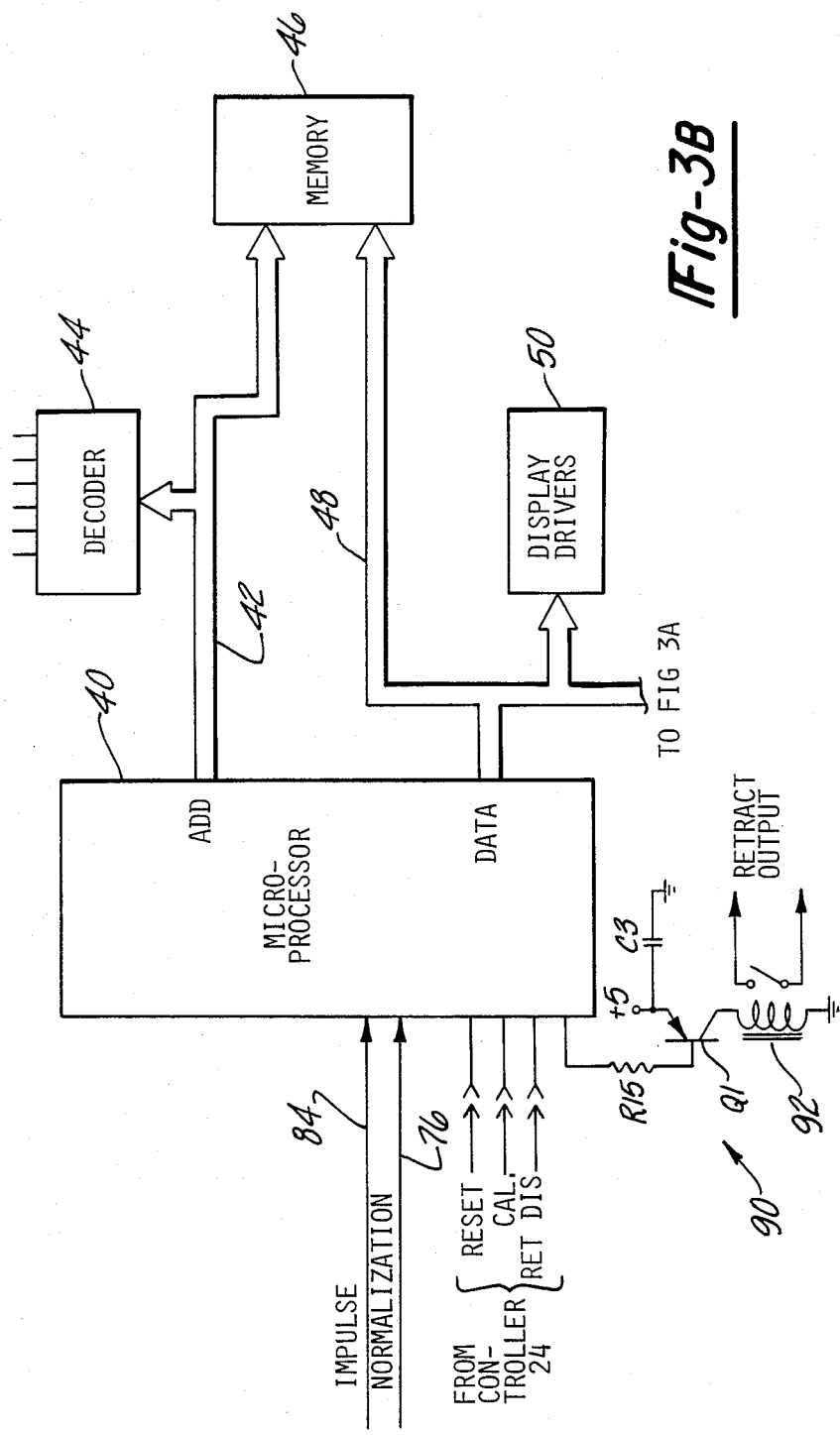

WORN TOOL DETECTOR UTILIZING NORMALIZED VIBRATION SIGNALS

DESCRIPTION

1. Technical Field

This invention relates to worn tool detection systems and, more particularly, to systems adapted to detect peaks in a sensor waveform to provide indications of tool wear.

2. Background Art

A major concern in the operation of machine tools is the maintenance of the cutting tools therein. It is important to immediately identify tools which have become worn, chipped or broken. Historically, on relatively simple machine tools, the operator would continually use a cutting tool until it was visually worn-out or broken. The "use until failure" method often results in the production of workpieces having cuts of varying precision as the tool becomes dull. The need to monitor tool condition is even more important in relatively sophisticated automated machines for if a broken tool is undetected the continuation of work may damage the workpiece as well as other tools in a multiple spindle machine.

Preventive maintenance programs which involve periodic replacement of cutting tools before they wear out have been adopted. Although such programs have the advantage of permitting predicted down-time, such as in the evening or between work shifts, it introduces waste in that tools with some useful life remaining are discarded. Accordingly, to maximize machine tool efficiencies and to minimize waste, it is important to monitor individual cutting tools and accurately determine the amount of wear of each so that the operator or the automated machine may be warned of impending tool failure to prevent catastrophic problems.

The prior art is filled with different systems for automatically detecting the condition of tools in machining apparatus. For example, in commonly assigned U.S. Pat. No. 4,207,567 to Juengel et al the power consumption of a machining center is used as an indication of tool wear. Other attempts include the use of signature analysis of the vibration from the machining operation as an indication of tool wear. These approaches have so far either proved unsuccessful or used spectral analysis to determine the amount of tool wear. These attempts have generally turned out to be too costly to implement their complex detection schemes or employ relatively slow analysis techniques such that tool failure is not quickly detected.

A particularly promising approach is disclosed in technical paper MR82-901, Society of Manufacturing Engineers, Dearborn, Michigan (1982) entitled "An On-Line Method of Determining Tool Wear By Time-Domain Analysis" by Yee et al. This paper, which also includes an excellent discussion of the prior art, discloses the detection of peaks or impulses from an accelerometer waveform synchronously related to the period of rotation of the tool. When a peak exceeding a threshold level is found, the input waveform is repetitively sampled at rotational period intervals until four sequential peaks are found at which time a signal is generated to retract the tool.

Obviously, the proper establishment of the threshold level is of utmost importance. According to the teachings of this paper the threshold level is successively reduced at fixed intervals until the accelerometer signal begins to exceed the threshold. In other words, the threshold is varied during a learn or calibration step using a new tool until the amplitude of the waveform begins to exceed the variable threshold level. During operation, the threshold is set at this level and subsequentially generated peaks indicative of tool wear are detected by comparing the accelerometer signal with this fixed threshold level.

Unfortunately, this approach has some drawbacks which decreases its ability to be used in a wide variety of machining operations. In some machining operations, it may not be possible to place the accelerometer very close to the point of contact between the tool and the workpiece. As a consequence, the average amplitude of the accelerometer signal may be quite small. Consequentially, it is necessary to set the variable threshold level quite low. At this low threshold level it becomes difficult to discriminate valid tool wear peaks from other nonrelated impulses in the accelerometer signal thereby decreasing the accuracy or resolution of the detection system. Still other problems are expected to be experienced if the accelerometer waveform amplitude is very large due, for example, to a close spacing between the accelerometer and the tool.

The present invention is directed to solving these problems and providing a commercially viable worn tool detection system that is capable of being used in a wide variety of machining applications.

SUMMARY OF THE INVENTION

Pursuant to the present invention the signal waveform from a vibration sensor is connected to a variable gain amplification network including at least one digitally controlled component for effecting a change in gain in the network. Comparator means are provided for supplying a signal to a microprocessor indicative of the relative difference between the output of the variable gain network and a fixed reference voltage. The microprocessor is operative to respond to the comparator output and normalize the sensor waveform by varying the gain network until the average amplitude of the waveform is substantially equal to the reference. During the operational cycle of the machine, an indication of tool wear is provided by sensing the occurrence of impulses in the sensor waveform having amplitudes exceeding the normalized level. When a given number of successive impulses are detected within a time period associated with the period of rotation of the tool, a warning signal is generated which may be used to retract the tool from the workpiece.

According to another aspect of this invention an adaptive mode is provided whereby the sensor signal is repetitively normalized during machine operation. The repetitive normalization automatically adjusts for variations in the amplitude of the sensor signal which may be due, for example, to the change in relative distance between the sensor and the tool during the machining operation. A feature of this invention includes the provision for disregarding potentially erroneous impulses detected by the system circuitry when the tool is not in the position to provide valid data to the sensor.

BRIEF DESCRIPTION OF THE DRAWINGS

Various advantages of the present invention will become apparent to one skilled in the art upon reading the following specification and by reference to the drawings in which.

DESCRIPTION OF THE PREFERRED EMBODIMENT

Figure 1:
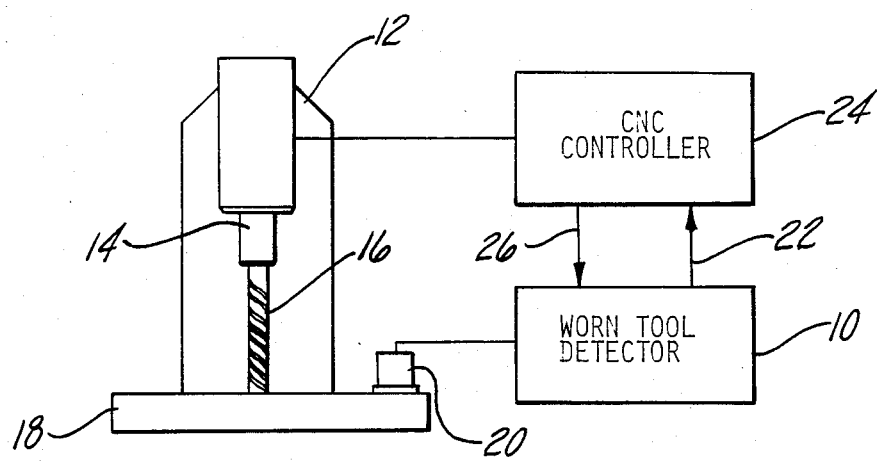
FIG. 1 illustrates a simplified form of a machine tool utilizing the worn tool detector of the present invention.

FIG. 1 illustrates, in simplified form, a typical environment in which the worn tool detector 10 of the present invention may be employed. A machine tool 12 including a spindle 14 for rotating a tool such as drill bit 16 is shown for drilling holes in a workpiece 18. A vibration sensor 20 is suitably mounted in a position to detect vibrations created during a machining operation. In this embodiment, sensor 20 takes the form of a piezoelectric accelerometer which may be magnetically mounted to workpiece 18.

Sensor 20 is coupled to an input of worn tool detector 10 which is adapted to transmit a warning signal over line 22 indicative of impending tool failure or other wear related conditions. The warning signal may be coupled to a computer numerically controlled (CNC) controller 24 which serves to retract drill bit 16 upon receipt of the warning signal from detector 10. Alternatively, detector 10 may be directly coupled to the retract control of the machine tool 12 in which case controller 24 may communicate via line 26 with detector 10 to provide control signals thereto.

It should be understood that while detector 10 is shown in FIG. 1 in connection with detecting the condition of a drill bit, the present invention finds utility in a wide variety of machining operations.

Figure 2:
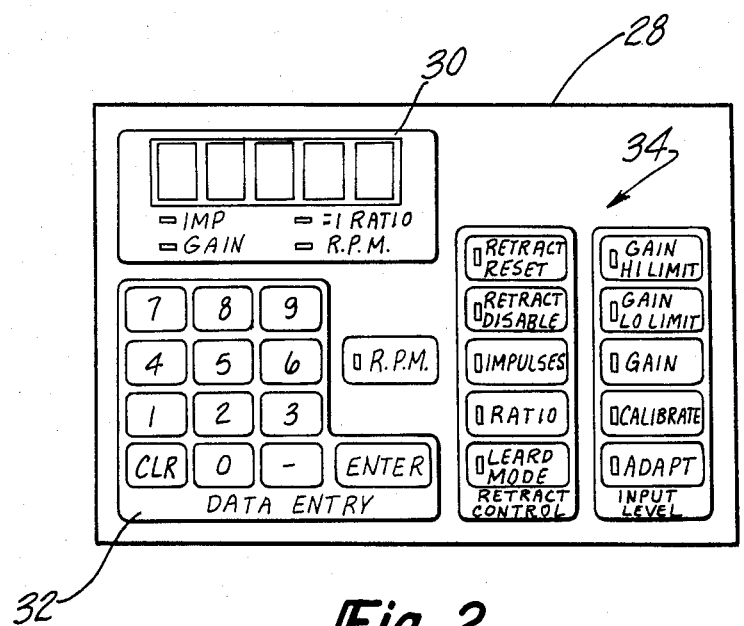
FIG. 2 is a view showing the front panel of the detector of the preferred embodiment.

FIGS. 2 and 3 illustrate in detail the front panel and internal circuitry for detector 10. Front panel 28 includes a multi-digit display 30, a data entry keyboard 32 and an array of command touch switches generally designated by the numeral 34. The operation of these input devices will be described in more detail later herein.

Turning now to FIG. 3, a microprocessor 40 such as a Motorola MC68701 forms the heart of the electronic-control system. As is known in the art, microprocessor 40 includes address lines which are coupled via an address bus 42 to a decoder 44 and associated memory 46. Decoder 44 serves to, among other things, address particular components in the system. Memory 46 is representive of one or more storage devices capable of storing program information, temporary back-up data and the like. Data from microprocessor 40 is coupled to the system components over data bus 48 which is shown connected to memory 46 and display driver circuitry 50 for controlling the operation of the display 30 on the front panel. Data bus 48 is also advantageously employed to control the components of a variable gain amplification network 52 and ratio selection circuitry 54.

Figure 3A:
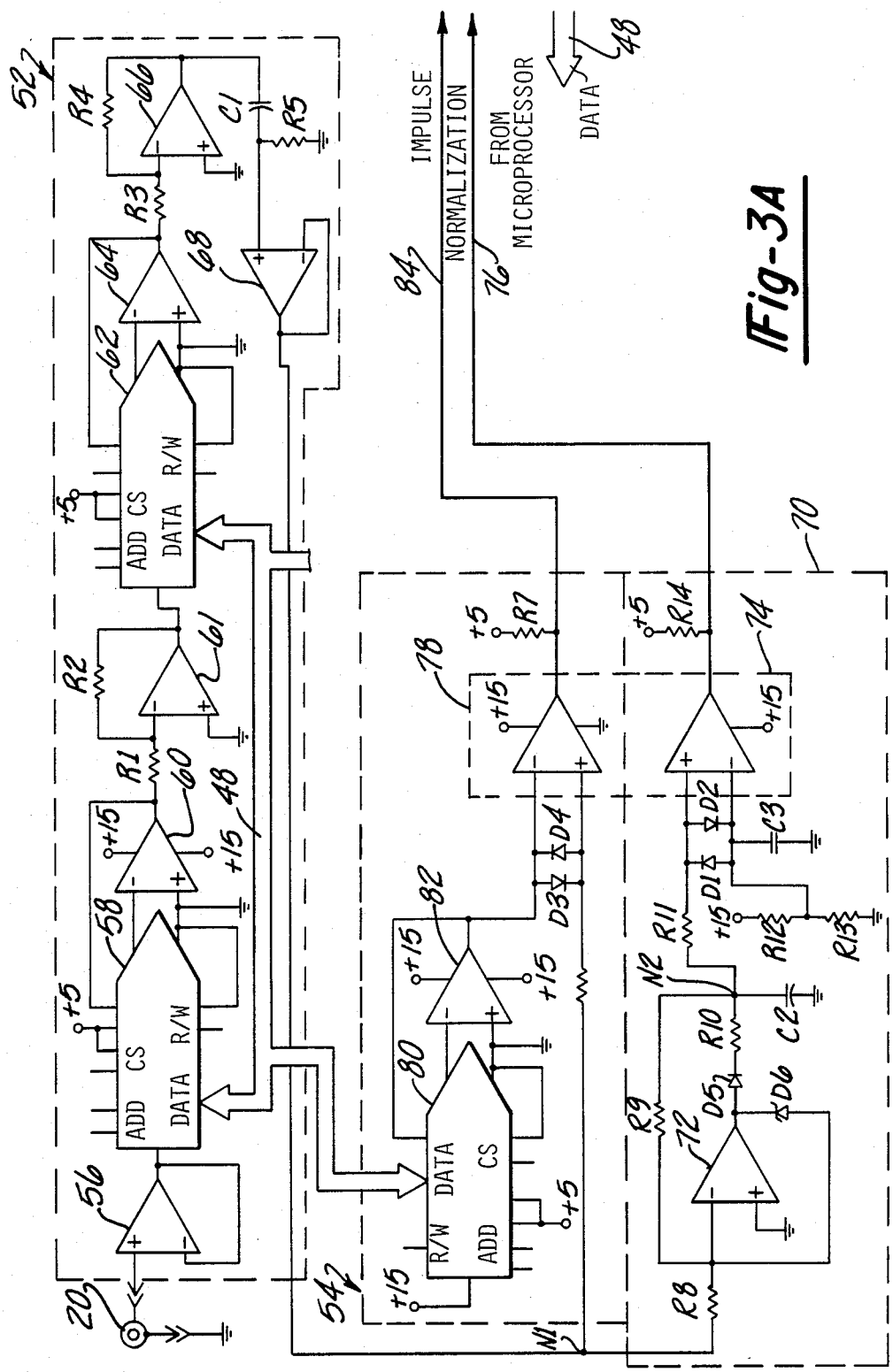
FIG. 3 (A-B) is a schematic diagram of the electrical circuitry used in the preferred embodiment.

With special emphasis now being drawn to FIG. 3A, the accelerometer 20 is shown being connected to the input of variable gain network 52. Network 52 includes a buffer amplifier 56 providing a high impedance input and a low impedance output with a gain of one. The output of amplifier 56 is connected to a digitally controlled multiplying digital to analog (D/A) converter 58. The output of D/A converter 58 is connected to operational amplifier 60. The combination of converter 58 and amplifier 60 provides a variably controlled gain of between zero and absolute 1. The amount of gain is controlled by the digital signal supplied from microprocessor 40 over data bus 48 which is connected to inputs of converter 58. In this embodiment, converter 58 is a 12 bit multiplying digital to analog converter such as component number AD7542 by Analog Devices. As is known in the art, converter 58 serves as a digitally controlled current divider which provides a 0-1 ratio of the input current depending upon the code defined by the digital signals supplied from microprocessor 40. The op amp 60 is used to convert the current back into a corresponding voltage.

The output of amplifier 60 is connected to the input of amplifier 61 which is configured so as to have a gain of 25. Its output is connected to similar D/A converter 62 and amplifier 64 combination which operates in the same manner as the converter 58 amplifier 60 combination. The output of amplifier 64 is connected to another amplifier 66 also having a gain of 25. Buffer amplifier 68 and associated resistive capacitive network operate to remove any D.C. offset from the amplified signal from amplifier 66. It should be appreciated that the variable gain network 52 is operative to amplify the accelerometer input signal by a gain of zero to 625. The actual amount of gain is controlled by the contents of the digital signals applied to converters 58 and 62 over data bus 48 from microprocessor 40.

The amplified accelerometer signal derived from the output of network 52 is connected to node N1. Node N1 is connected, in turn, to normalization circuitry 70. Operational amplifier 72 and its associated components serve to supply at Node N2 a halfwave rectified and filtered version of the signal applied to its input. In other words, this circuitry serves to filter out the peaks in the gain adjusted accelerometer signal and provides a DC level substantially equivalent to the average amplitude of the waveform. This DC signal is connected to the non-inverting input of comparator 74. The inverting input of comparator 74 is connected to a fixed reference level. In this embodiment the fixed reference level is one volt derived from a voltage division of a 15 volt regulated power supply input by precision resistors R12 and R13. The output of normalization circuit 70 provides on line 76 a signal whose state indicates whether the average amplitude of the amplified accelerometer signal is above or below the fixed one volt reference. Line 76 is coupled to an input port of microprocessor 40.

The amplified accelerometer signal at Node N1 is also supplied to the non-inverting input of comparator 78. Comparator 78 is adapted to provide instantaneous comparison of the normalized accelerometer waveform with a threshold voltage level established by the ratio selection circuitry 54. Circuitry 54 employs another digitally controlled D/A converter 80 and associated amplifier 82 to provide a selected voltage level which must be exceeded before comparator 78 will trip or change state. As will appear, circuitry 54 is termed a ratio selection network because the level that it generates is generally a ratio of the amplitude of the impulses desired to be detected and the average amplitude of the accelerometer waveform. In this embodiment, ratio selection network 54 is adapted to provide voltage levels of zero to 15 volts to the invering input of comparator 78. When this level has been exceeded line 84 will provide an interrupt signal to microprocessor 40.

Figure 4:
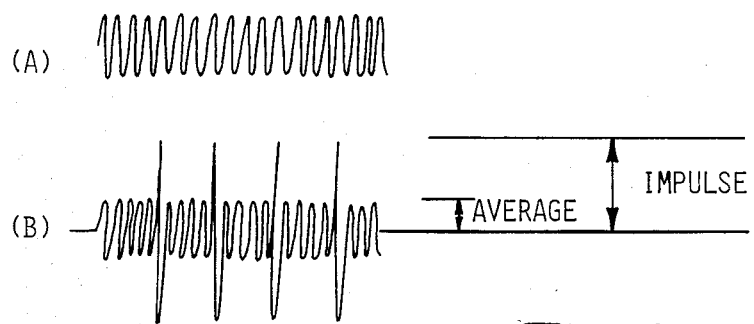
FIG. 4 (A-B) illustrates typical waveforms generated by the vibration sensor and used by the detector of the preferred embodiment.

The operation of the tool detector system of the preferred embodiment will now be described. Normally, the user will first enter the calibration mode by pressing the "Calibrate" button on the control panel 28. A new drill bit 16 is inserted and the machining operation begun. FIG. 4A illustrates a typical accelerometer waveform that is generated with a new tool. However, the peak-to-peak amplitude to the accelerometer waveform will vary depending upon such things as the type of accelerometer or other sensor that is utilized, its position with respect to the point of contact between the drill and the workpiece, and other factors. Pursuant to this invention the tool detector 10 operates to normalize the accelerometer waveform to a one volt level regardless of its original amplitude.

With reference to FIG. 3, microprocessor 40 initially uses a successive approximation technique to adjust the gain of variable gain network 52 so that its output is approximately one volt. This is accomplished by initially setting the gain of converters 58 and 62 to approximately one-half full scale or one-half of the maximum 625 gain amplification capability. The ratio network 54 is also setup by microprocessor 54 to provide a one volt reference level to the input of comparator 78. If the microprocessor interrupts via a signal on line 84, the gain is set too high and microprocessor 40 serves to decrease the gain using standard successive approximation techniques. If the gain is too low it instead increases it. This iterative process continues for 10 times thereby bringing the amplified accelerometer signal to approximately the desired one volt reference at Node N1. Then the normalization circuit 70, in cooperation with microprocessor 40, operates to slowly adjust the gain of network 52 until the output of comparator 74 indicates that the appropriate gain has been reached to bring the waveform to the precise one volt normalization level.

After the accelerator waveform has been normalized, the user may enter the learn mode. In this mode of operation, the user programs in the number of RPM's at which the machine tool operates and further may program a fixed number of impulses that must be received before a retract condition is generated. Pursuant to the present invention, if a learn mode is enabled, the system will automatically increment the threshold level provided by ratio network 54. For example, microprocessor 40 will instruct converter 80 to set the reference level at a one-to-one ratio corresponding to a threshold level of one volt. Since the accelerometer waveform has been normalized to one volt this will cause the comparator 78 to generate an interrupt almost immediately. If the programmed number of synchronous impulses is seen at this ratio then microprocessor 40 operates to increase the threshold level provided by ratio network 54 to 1.5 volts and display it. At this low ratio another retract will probably occur without the tool breaking. Microprocessor 40 continues this process untill the tool breaks. After a series of these tests the operator can program in a lower ratio to cause tool retraction before his experience shows that the tool will break or otherwise causes undesirable machining operations.

In the normal operating mode the number of impulses and ratio have been set as well as the gain to normalize the average amplitude of the accelerometer waveform. FIG. 4B illustrates a waveform which may typically be generated from a worn tool about to fail. It can be seen that the waveform exhibits periodic impulses occurring at a rate associated with the period of revolution of the machine tool. When the amplitude of the impulses exceed the threshold level defined by ratio network 54, comparator 78 will generate an interrupt signal to microprocessor 84. Microprocessor 84 then will utilize the pre-programmed RPM information to define a window in which successive impulses must be received in order to be valid. This window may be provided by a software controlled counter within microprocessor 40. This window is generally chosen to occur a given number of times per revolution of the machine tool such as the time that the two flutes of the drill bit engage the workpiece. Signals not occurring within this window are not considered as valid tool indication criteria as they may be created by noise and other transients within the environment. If a pre-programmed number of successive impulses are received within the window then the microprocessor 40 generates a retract signal for retracting the tool from the workpiece.

A particularly advantageous feature of the present invention is the provision of an adaptive mode in addition to the normal operation mode just described. During the adaptive mode the detector 10 operates to repetitively normalize the average amplitude of the sensor waveform throughout the entirety of the machining operation. The system accuracy is thereby increased because the circuitry of the present invention automatically adjusts for changes in the amplitude of the sensor signal. Such changes may be due to such things as differences in the relative spacing between the drill bit-workpiece engagement point and the accelerometer. For example, if the machine tool is adapted to drill a number of holes in the workpiece along its length, when the drilled hole gets closer to the accelerometer 20 the output thereof will increase in amplitude. Conversely, the further away that the accelerometer is from the engagement point the accelerometer amplitude will decrease. Note that in the non-adaptive or normal mode the accelerometer signal is normalized with respect to a fixed spacing between the accelerometer and the tool engagement point with the workpiece. Consequentially, if the drilled holes become significantly closer to the accelerometer than during the calibration step then it may become difficult to discriminate between the tool wear indication impulses and the other peaks in the accelerometer waveform. However, this problem is alleviated by continually normalizing the input in the adaptive mode. If, for example, the drilled hole becomes closer to the accelerometer resulting in a high amplitude signal, the variable gain adjustment network 52 will automatically decrease its resulting gain to provide the normalized one volt level. As a result, the normal impulse detection comparison technique remains accurate and will not detect false data.

The present invention also includes the provison for ignoring impulses detected by comparator 78 during periods of time in which the accelerometer signal is not normalized in the adaptive mode. Those skilled in the art will appreciate that it takes a finite period of time to undergo the aforementioned normalization sequence. Consequentially, where there are large transitions of the accelerometer waveform there may be periods of time in which the system has not fully normalized the waveform. An example of where this may occur is in peck drilling where the drill undergoes a plurality of cyclic operations in which the drill repetitively engages the workpiece for a period of time and then is retracted.

Figure 5:
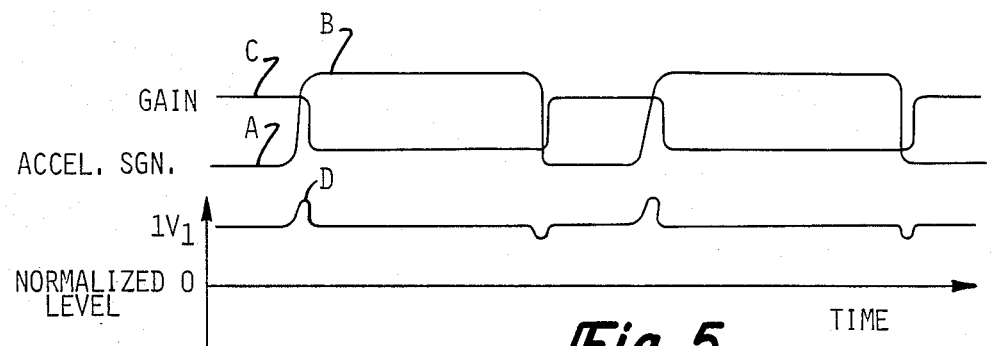
FIG. 5 is a timing diagram which illustrates in simplified form the normalization operation of the detector of the preferred embodiment in an adaptive mode.

FIG. 5 shows the relationship between the gain derived from the gain adjustment network 52 and the normalized level provided by the system when the average amplitude of the accelerometer signal undergoes large changes as may be experienced during peck drilling. The accelerometer signal at point A represents the accelerometer signal when the tool has been retracted. Point B represents the increase in amplitude of the signal when the drill has engaged the workpiece. The gain of network 52 is high as shown at point C when the accelerometer signal is relatively low in order to bring it to the normalized one volt level. When the drill begins contacting the workpiece, the accelerometer signal quickly increases but it may not be possible for the circuit to react fast enough to decrease the gain of network 52 to immediately normalize the new high amplitude waveform. As a consequence, the level applied to the non-inverting input of comparator 78 may be temporarily too high as shown at point D. This could result in the detection of false impulses not related to tool wear.

Figure 6:
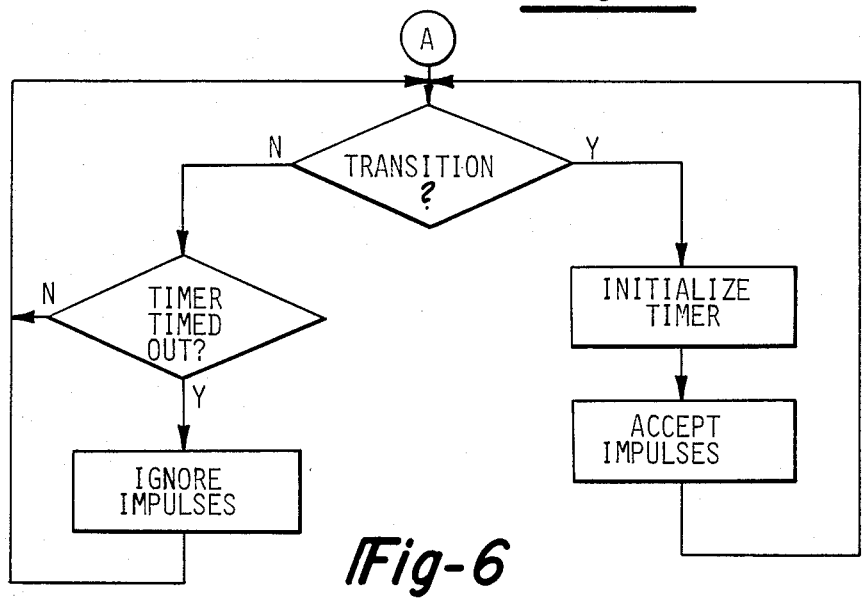
FIG. 6 is a flow chart showing operational steps performed by the microprocessor in the adaptive mode of the detector of the preferred embodiment.

Pursuant to the present invention, microprocessor 40 is adapted to monitor the transitions or change of state of comparator 74 that occurs during the normalization process. The subroutine of FIG. 6 illustrates in simplified form the operation of microprocessor 40. In the above example, a transition will occur from comparator 74 when the accelerometer signal has increased to point B because the past gain of network 52 will deliver a DC level to the non-inverting input of comparator 74 which greatly exceeds the fixed one volt reference coupled to the inverting input. This transition on line 76 causes the microprocessor 40 to begin reducing the gain of network 52. However, if there is a large difference it will take an appreciable amount of time before the gain is adjusted to a point where the input to comparator 74 is lower then the fixed one volt reference. It is during this time that potentially false impulses may be detected. To prevent this from occuring microprocessor 40 resets a software control counter which begins counting upon receipt of each transition form comparator 74. If another transition is not received within a pre-programmed time limit, the counter will time-out and the microprocessor will ignore the impulse signals which may be received on line 84. When the system has adjusted the gain of network 52 to the normalized level the transitions from comparator 74 will appear regularly and the microprocessor will again consider signals on line 84 as valid impulses.

Those skilled in the art should now be able to appreciate the improvements provided by way of this invention. Accurate indications of tool wear are provided using cost-effective circuitry and easily implemented techniques. The tool detector system has great flexibility and is capable of being used in a wide variety of diverse machining applications. Still other advantages of the invention will become apparent upon a study of the specification, drawings and following claims.

I claim:

1. In a worn tool detector system for analyzing input signals from a sensor where the signal is in the form of an analog waveform exhibiting periodic impulses exceeding the average amplitude of the waveform as the tool wears, the improvement comprising:

a variable gain amplification network connected to the sensor, said network including at least one digitally controlled component for effecting a change in gain of the network;

reference means supplying a fixed reference voltage;

comparator means having inputs coupled to outputs of the variable gain network and said fixed reference voltage;

digital control means having an input coupled to an output of the comparator and an output coupled to the digitally controlled component, operative to normalize the sensor signal by varying the gain of said network until the average amplitude of the waveform is substantially equal to the reference voltage; and detector means coupled between the gain network and the digital control means for detecting the occurrence of the impulses by sensing voltage levels of the amplified sensor signal exceeding the normalized level.

2. The improvement of claim 1 wherein said digital control means include a microprocessor adapted to provide gain adjustment signals over a data bus to the digitally controlled component in the gain amplification net work.

3. The improvement of claim 2 wherein said gain amplification network includes a multiplying digital to analog converter adapted to receive signals from the microprocessor over the data bus, and a fixed gain amplifier connected to the converter whereby the signals from the microprocessor operate to adjust the gain of the converter-amplifier combination.

4. The improvement of claim 3 wherein said detector means includes a second digitally controlled component and a second fixed gain amplifier, the second component being connected to the microprocessor and adapted to generate a selected voltage level associated with a preselected ratio of impulse amplitude to the average waveform amplitude, and a second comparator having inputs coupled to the second amplifier and the gain amplification network serving to detect the occurrence of impulses having amplitudes exceeding the selected voltage level.

5. The improvement of claim 4 wherein said second digitally controlled component is a multiplying digital to analog converter.

6. The improvement of claim 3 which further comprises a control panel having devices thereon enabling the user to program the preselected ratio.

7. The improvement of claim 3 wherein said mircroprocessor is adapted to automatically increment the ratio during a learning mode.

8. The improvement of claim 1 which further comprises:

rectification means coupled to the output to the gain amplification network, operative to provide a DC level corresponding to the average amplitude of the amplified waveform to an input of said comparator for comparison with said reference voltage.

9. The improvement of claim 7 wherein said control panel includes input means enabling the user to enter a value associated with the revolutions per minute of the tool being monitored, with said microprocessor utilizing said value to define a time-related window in which impulse detection signals from the detector means must be received to be considered valid tool indication signals.

10. The improvement of claim 9 wherein said microprocessor is operative to count impulse signals received within the window, and wherein said microprocessor operates to generate a warning signal indicating impending tool failure upon receipt of a given number of successive impulse signals.

11. The improvement of claim 10 wherein said warning signal is utilized to retract the tool.

12. The improvement of claim 1 wherein said sensor is an accelerometer.

13. The improvement of claim 12 wherein said accelerometer is mounted on a workpiece.

14. In a worn tool detector system for analyzing an input signal from a vibration sensor where the signal is in the form of an analog waveform exhibiting periodic impuses exceeding the average amplitude of the waveform as the tool wears, the improvement comprising:
 a variable gain amplification network having an input connected to the output of the sensor, said network including a series connected circuit including a pair of multiplying digital analog converters and associated fixed gain amplifiers, operative to amplify the sensor waveform;
 normalization circuit means including means for rectifying the output of the variable gain network to provide a DC level associated with the average amplitude of the amplified sensor waveform, a first comparator having an input connected for receipt of said DC level signal and having another input connected to a fixed reference voltage, said first comparator having an output whose state is indicative of the relative difference of the voltage levels applied to its inputs;
 a ratio selection network having a multiplying digital to analog converter and associated amplifier, adapted to provide a selected threshold level;
 a second comparator having one input connected to the output of the ratio selection network and another input connected to the output of the variable gain network, operative to provide an output signal if the amplified sensor waveform exceeds the threshold level provided by the ratio selection network;
 retract means for generating a signal for retracting the tool; and
 microprocessor means coupled for receipt of output signals from the first and second comparators, operative to generate control signals over a data bus to the converters of the variable gain network to adjust the gain thereof until the sensor signal is subtantially equal to the fixed reference voltage, said microprocessor being further adapted to provide selected signals to the converter of the ratio network to define the selected threshold level, whereby said microprocessor is operative to generate a signal to energize the retract means upon receipt of a successive number of signals from the second comparator indicative of impending tool failure.

15. An adaptive method of detecting tool conditions in an automated machine, said method comprising:
 mounting a vibration sensor in a position to detect vibrations created during machining operations;
 continuously normalizing the average amplitude of a waveform generated by the sensor to a fixed level during the entirety of machine operation;
 detecting the occurrence of impulses in the waveform having an amplitude exceeding said normalized level; and
 generating a warning signal indicative of tool condition upon detection of a given number of impulses.

16. The method of claim 15 wherein said normalizing step is performed by repetitively adjusting the gain of a variable gain amplification network until the average amplitude of the waveform is substantially equal to the fixed level.

17. The method of claim 16 which further comprises the steps of:
 monitoring the time required to normalize the sensor waveform to the fixed level; and
 selectively terminating detection of the impulses until the waveform is substantially normalized, thereby preventing false detection of tool wear related signals when the gain is initially larger than necessary to bring the waveform to the selected normalized level.

* * * * *